Patented Aug. 24, 1948

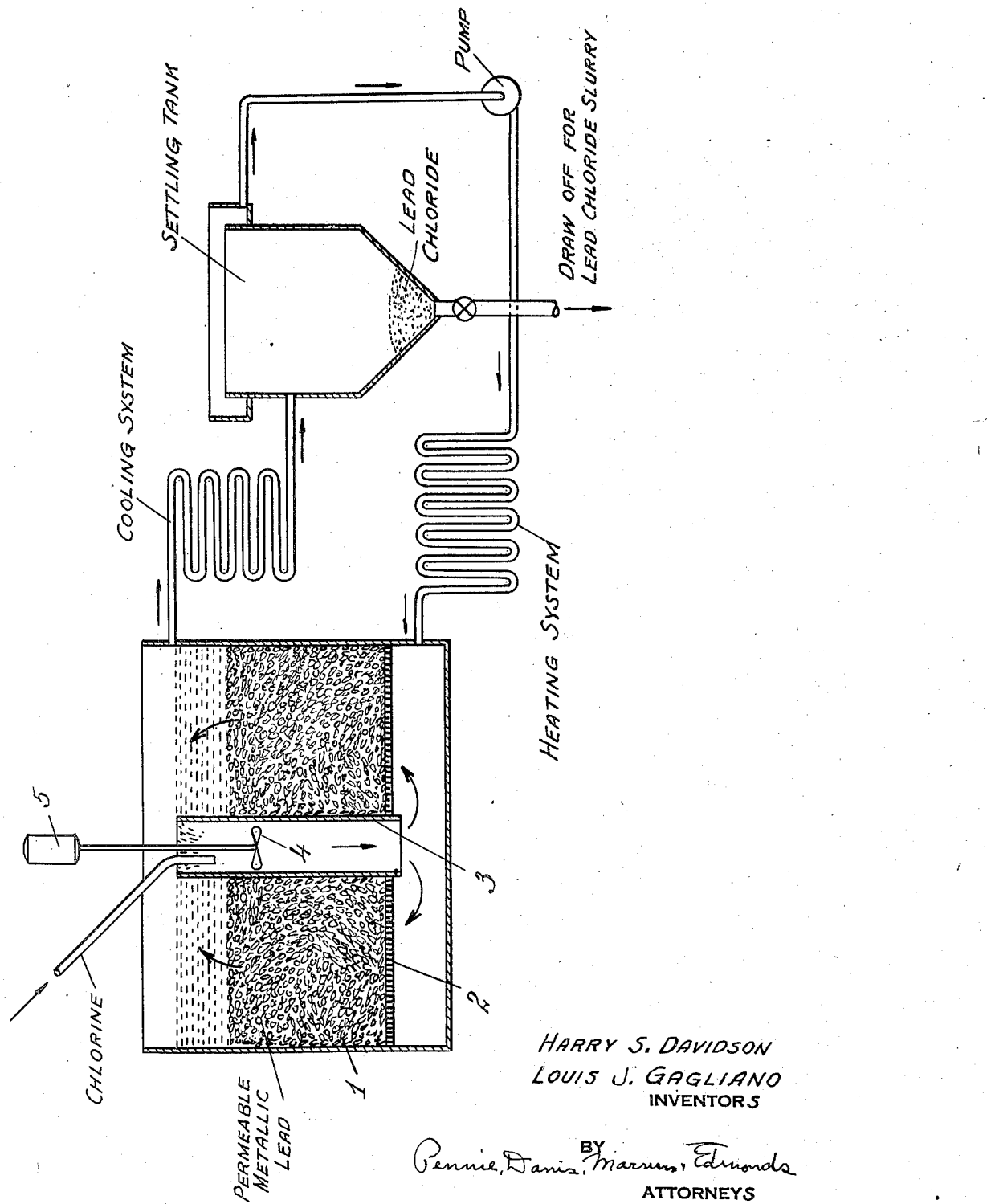

2,447,742

UNITED STATES PATENT OFFICE 2,447,742

MANUFACTURE OF LEAD HALIDES

Harry S. Davidson and Louis J. Gagliano, Glens Falls, N. Y., assignors to Imperial Paper and Color Corporation, Glens Falls, N. Y., a corporation of New York Application August 3, 1945, Serial No. 608,740

5 Claims. (Cl. 23—97)

This invention relates to the manufacture of lead halides and more particularly to the manufacture of lead halide from metallic lead and the corresponding elemental halogen. The invention aims to provide a novel and improved method of manufacturing lead halides and particularly lead chloride. The invention will be hereinafter particularly described in its application to the manufacture of lead chloride, although it is to be understood that the principles of the invention may be applied with advantage to the manufacture of other lead halides, such as the bromide, fluoride or iodide.

While lead chloride is an old and well-known chemical, it has not heretofore been an important article of commerce. It is rarely, if ever, listed as an industrial chemical, and is generally marketed for laboratory purposes only. In the rare instances that lead chloride is used in a commercial manufacturing process, it is customarily made by the user by reacting hydrochloric acid and litharge or white lead. This method of production is expensive, since lead in the form of oxide or carbonate and chlorine in the form of hydrochloric acid are more costly than their elemental forms. The present invention contemplates the production of lead chloride directly from elemental lead and elemental chlorine, with a saving in raw material costs of about 25% as contrasted, for example, with the production of lead chloride from hydrochloric acid and litharge.

It has long been known that metallic lead is corroded or attacked by moist chlorine gas with the formation of lead chlorides. Thus, if moist chlorine gas, or chlorine solution, is brought in contact with metallic lead, other compounds as well as normal lead chloride ($PbCl_2$) are formed. These other compounds are frequently chloride or oxide mixtures with some lead having a valence higher than two. These compounds are relatively insoluble, coat the lead, and are undesirable both physically and chemically. We have found that if the chlorine solution is made sharply acid, in the presence of excess metallic lead, the formation of these undesirable compounds is avoided.

The solubility of lead chloride in water is relatively low, but increases with increase in temperature. Thus, a saturated solution at 15° C. contains 0.85% $PbCl_2$; at 50° C. 1.75% $PbCl_2$; and at 100° C., 3.1% $PbCl_2$. These solubilities are too low for most practical uses of the solution. However, by saturating the solution at a higher temperature it is possible by cooling the solution to obtain lead chloride as a precipitate. But if the lead chloride is allowed to precipitate in the presence of the metallic lead it adheres to the lead, reducing the rate of formation of further lead chloride, and making separation of the lead chloride from the lead difficult.

The foregoing and other difficulties are overcome in the method of the invention by circulating a warm or heated acidified aqueous solution of lead chloride over metallic lead in the presence of chlorine until the solution is substantially saturated with lead chloride, and then withdrawing from contact with the metallic lead and cooling the substantially saturated solution and thereby precipitating some of the lead chloride. The lead chloride precipitate is separated from the cooled solution, and the residual cooled solution is heated and circulated again over metallic lead in the presence of chlorine for the production of a further quantity of substantially saturated lead chloride solution. The method is advantageously carried out in a cyclic manner, the aqueous solution of lead chloride circulating in a closed cycle including in sequence a body of metallic lead in the presence of chlorine, a cooling system, a lead chloride settling chamber, and a heating system. Lead chloride is formed and dissolved in the heated solution as it circulates over the body of metallic lead in the presence of chlorine and lead chloride is precipitated from the cooled solution and the precipitate is separated from the solution as it passes through the settling chamber. The lead chloride solution is preferably acidulated with hydrochloric acid and its pH should be maintained less than 4 and preferably about 1.5. The hydrochloric acid content of the solution is less than 1% by weight. Nearly all of the lead chloride is formed from the chlorine, but a little of the hydrochloric acid is consumed and additions are made as required from time to time in the practice of the process.

In carrying out the method of the invention, a tank or other suitable vessel with a false bottom is filled or partially filled with a permeable mass of metallic lead, preferably in a form having a large surface such as "feathered" lead produced by melting and sheeting or spraying the lead into water. The tank is filled with acidified water or an acidified aqueous solution of lead chloride. Chlorine is fed into the tank, while maintaining the solution at a relatively high temperature, for example 85° C. The chlorine and metallic lead react to form lead chloride which dissolves in the solution, and circulation is continued until the solution is substantially saturated with lead chloride. The saturated solution of lead chloride is then withdrawn from the tank and passed through a cooling system which substantially lowers its temperature, for example to 40° C., and thereby brings about a precipitation of lead chloride. From the cooling system the cooled solution passes to a settling tank where the precipitated lead chloride settles from the solution. The residual cooled solution is then reheated and returned to the tank for circulation again over metallic lead in the presence of chlorine. The tank containing the metallic lead is preferably provided with means for inducing forced circulation of the solution in addition to that provided by the cyclic system. This means may conveniently comprise a downdraft vertical tube within which a rotating propeller forces the solution from the top of the tank down the tube below the perforated false bottom and up through the metallic lead. It is also desirable to heat the solution indirectly so as not to increase its volume beyond that needed.

The single figure of the accompanying drawing diagrammatically illustrates, in a simplified form, a suitable arrangement of apparatus for practicing the invention in its preferred cyclic aspect. The treatment tank 1 has a perforated false bottom 2 upon which rests a permeable body of metallic lead. The tank has a centrally positioned down-draft tube 3 extending from just below the perforated bottom upwardly to approximately the liquid level in the tank. A propeller 4 positioned within the tube and rotated by a suitable motive means 5 induces a downward flow of solution through the tube 3. Chlorine gas is continuously introduced into the tube 3 beneath the vortex of the solution as it is drawn into the tube by the action of the propeller 4. The tank may, if desired, be covered to prevent the escape of chlorine. Explanatory legends designate the other elements of the apparatus illustrated in the figure.

In carrying out the method of the invention in the apparatus illustrated in the accompanying drawing, the entire system is filled with acidified water. Cyclic circulation is started, chlorine is introduced, and the acidified water (solution) is brought up to the temperature required in the tank 1 (say around 85° C.). The rotating propeller 4 induces local circulation of the solution upwardly through the permeable metallic lead thus insuring repeated contact of the solution with the lead and thereby expediting the formation of lead chloride. The formation of lead chloride begins at once and dissolves in the solution up to the point of saturation. When the solution is substantially saturated with lead chloride, the cooling system is started. As the substantially saturated solution passes through the cooling system it is cooled to say about 40° C. and its solubility for lead chloride is exceeded and lead chloride therefore precipitates and settles out as the solution passes through the settling tank. The residual cool solution overflows the settling tank and is pumped through the heating system which raises its temperature back to 85° C. The solution is now unsaturated and hence ready to dissolve more lead chloride as it is formed in the tank 1. The flow of solution through the apparatus is continuous. No lead chloride or other compound is deposited on the lead. A very pure lead chloride ($PbCl_2$) is precipitated and recovered. The precipitated lead chloride may be processed in various ways familiar to those skilled in the chemical industry. It may be removed continuously or allowed to accumulate and removed as a batch. The lead chloride slurry removed from the settling tank may be used in that form, or filter-pressed, centrifuged, washed, dried, etc.

Practice of the invention in the manner hereinbefore described makes possible a recovery of about 1% lead chloride from the solution as it is circulated. While this is economically sound, the cost of heating and cooling can be reduced if the difference in solubility of the lead chloride per degree of temperature change is increased. The addition of a material which increases the solubility will usually increase the temperature differential solubility. Many salts increase the solubility of lead chloride in water, but most of these salts form solid complexes with the lead chloride which are undesirable. There are however certain salts, notably sodium chloride, which can be used with advantage to increase the temperature differential of solubility of lead chloride in the method of the invention. Thus, by using an acidified solution containing from 20 to 27% sodium chloride by weight, the solubility and temperature differential solubility is increased to such an extent that the yield of precipitated lead chloride per cycle is about 5% of the circulating solution, thus materially reducing the cost of heating and cooling the solution and the size of the equipment. We preferably include about 26% by weight of sodium chloride in the circulating solution. With a greater concentration of sodium chloride, the precipitate will contain some of the double salt of sodium chloride and lead chloride. If the concentration of sodium chloride is less than 20%, the beneficial solubility effect is undesirably reduced. These percentage figures for sodium chloride are based on the weight of the initial acidified solution before solution of any lead chloride, and hence will be correspondingly lower as dissolved lead chloride increases the specific gravity of the circulating solution.

When the circulating solution contains sodium chloride, or equivalent agent for increasing the temperature differential solubility of lead chloride, the lead chloride which is recovered from the settling tank will be contaminated with sodium chloride or equivalent agent. Such contamination, however, can be reduced to a very low figure by a small displacement wash with water, since lead chloride is relatively insoluble in cold wash water.

We claim:

1. The method of making lead chloride which comprises circulating over metallic lead a heated solution of lead chloride acidified with hydrochloric acid to a pH less than 4 with an acid content less than 1% by weight of the solution, introducing chlorine gas into the circulating solution and forming lead chloride by the reaction of chlorine with metallic lead, withdrawing at least part of said acidified chlorine-containing solution from contact with said metallic lead as it becomes substantially saturated with lead chloride, cooling the withdrawn solution and thereby precipitating a substantial amount of lead chloride, separating the precipitated lead chloride from the residual solution, and heating the residual solution and again circulating it as aforesaid over metallic lead.

2. The method of claim 1 further characterized in that the heated solution of lead chloride is acidified to a pH of about 1.5.

3. The method of making lead chloride which comprises circulating over metallic lead a heated solution of lead chloride containing 20 to 27% by weight of sodium chloride and acidified with hydrochloric acid to a pH less than 4 with an acid content less than 1% by weight of the solution, introducing chlorine gas into the circulating solution and forming lead chloride by the reaction of chlorine with metallic lead, withdrawing at least part of said acidified chlorine-containing solution from contact with said metallic lead as it becomes substantially saturated with lead chloride, cooling the withdrawn solution and thereby precipitating a substantial amount of lead chloride, separating the precipitated lead chloride from the residual solution, and heating the residual solution and again circulating it as aforesaid over metallic lead.

4. The method of claim 3 further characterized in that the heated solution of lead chloride is acidified to a pH of about 1.5.

5. The method of making lead chloride which comprises introducing chlorine gas into a heated solution of lead chloride acidified with hydrochloric acid to a pH of about 1.5 and containing 20 to 27% by weight of sodium chloride and circulating the heated solution and chlorine introduced therein over metallic lead until the solution is substantially saturated with lead chloride formed by the reaction of the chlorine with metallic lead, withdrawing from contact with said metallic lead and cooling the substantially saturated acidified and chlorine-containing lead chloride solution and thereby precipitating a substantial amount of lead chloride, separating the precipitated lead chloride from the residual solution, and heating the residual solution and again circulating it as aforesaid over metallic lead.

HARRY S. DAVIDSON.
LOUIS J. GAGLIANO.

REFERENCES CITED

The following references are of record in the file of this patent:

UNITED STATES PATENTS

| Number | Name | Date |
|---|---|---|
| 984,525 | Barstow | Feb. 21, 1911 |
| 2,367,153 | Swinehart et al. | Jan. 9, 1945 |

OTHER REFERENCES

Seidell: Solubilities of Inorganic and Organic Compounds, 3rd ed., vol. 1, pages 1385 and 1391. Pub. in 1940 by D. Van Nostrand, N. Y.